Sept. 27, 1955     J. Q. WOOD     2,719,135
RECOVERY OF CARBON BLACK
Filed Dec. 29, 1952
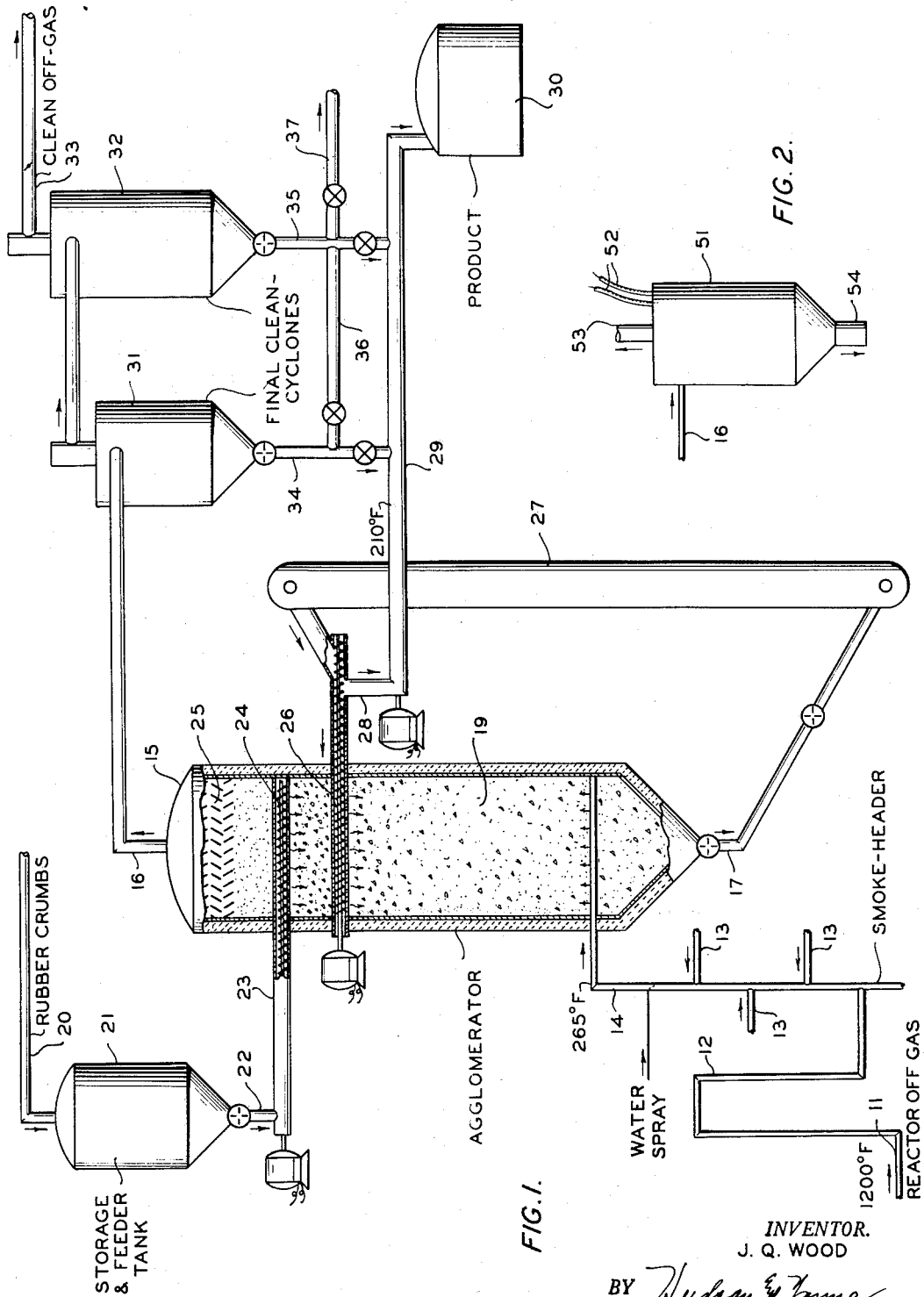
INVENTOR.
J. Q. WOOD
BY
ATTORNEYS

United States Patent Office 2,719,135
Patented Sept. 27, 1955

2,719,135

RECOVERY OF CARBON BLACK

James Q. Wood, Bartlesville, Okla., assignor to Phillips Petroleum Company, a corporation of Delaware Application December 29, 1952, Serial No. 328,349

16 Claims. (Cl. 260—33.6)

This invention relates to the recovery of carbon black. In one aspect it relates to a method for the separation and recovery of carbon black from carbon black production furnace effluents. In another aspect it relates to a method for the separation and recovery of carbon black from carbon black production furnace effluents in which the carbon black is recovered with unvulcanized rubber as a rubber-carbon black mixture.

Prior art teaches the separation of channel carbon black by impinging a smoky flame against a cold surface and scraping the deposited black from this surface. Bag filters and electrostatic precipitators are in common use for separating carbon black from gases resulting from the furnace production of carbon black. Prior art also teaches scrubbing of carbon black containing gases with water or with latex for the production of carbon black slurries. These slurries may be used in master batching operations as such or the slurries may be dried of their water content for the recovery of carbon black with or without the rubber.

An object of my invention is to devise a process for simultaneously recovering carbon black from production furnace effluent gases and mixing the recovered black with rubber in less elaborate and less costly plant equipment than required to carry out these operations separately.

Another object of my invention is to devise a process for recovering carbon black from carbon black production furnace gases and at the same time producing a carbon black-rubber mixture suitable for use in rubber compounding operations.

Still another object of my invention is to devise the above combination process which requires less expensive equipment than that required for separately recovering carbon black from the furnace gases and incorporating the carbon black in the rubber.

Yet another object of my invention is to devise a process for converting carbon black into an easily shippable form.

And another object of my invention is to devise a process for recovering carbon black from carbon black production furnace effluent gases and the simultaneous conversion of the black into an easily shippable form.

Other objects and advantages will be realized upon reading the following disclosure which taken with the attached drawing forms a part of this specification.

In the drawing,

Figure 1 illustrates diagrammatically one form of apparatus in which to carry out the process of my invention.

Figure 2 illustrates in diagrammatic form apparatus which can be used in place of a portion of the apparatus of Figure 1.

My invention involves the production of a rubber crumb-carbon black product which may or may not contain a rubber extender oil. In one embodiment my invention involves countercurrently contacting a descending mass of rubber crumb with carbon black furnace effluent gases containing the carbon black to be recovered. On initial contacting the crumb removes a portion of the carbon black from the gases. In order to increase the recovery of the carbon black from the gases a portion of the already contacted crumb is recycled into the contacting operation. By continually operating the recycle and finally contacting the almost fully treated gases with newly added crumb substantially all or at least a major portion of the carbon black is thus recovered. That portion of the carbon black not so recovered may be recovered in conventional cyclonic separators or by electrostatic separation, or bag filters.

In another embodiment in which the same material flow is involved the rubber crumb used for removal of the carbon black contains such an extender oil as is desired to be incorporated in the final rubber product.

By the term crumb rubber as used throughout this specification and claims is meant latex coagulated to crumb. This material is dried and macerated to a size varying from about 1/16 to 1/2 inch in diameter. The latex may be natural or synthetic.

Referring now to the drawing and specifically to Figure 1 carbon black production furnace effluent containing carbon black in suspension from a source not shown, enters the system through a line 11. This material is shown as passing into line 11 at a temperature of about 1200° F. This material is passed through an atmospheric cooler 12 into which is manifolded carbon black from other atmospheric coolers 13. The combined stream of gas containing suspended carbon is passed on through line 14 in which it may be waterspray cooled to 265° F. and then introduced into the lower portion of a contacting vessel 15. Rubber crumb with or without extender oil from a source, not shown, is passed into a run storage tank 21 through a line 20. From this storage tank 21 the crumb is passed through a feeder line 22 into a conveyor 23 which conveys the crumb into a distributor 24 inside the vessel 15. Bottoms material from the vessel is conducted through a feeder system 17 into an elevator 27 which elevates treated crumb for reintroduction as recycle material through a feeder 26 into the vessel 15. This feeder 26 is positioned below the raw crumb feeder 24. A conduit 28 is attached to the feeder conduit 26 for removing a portion of the recycle material as a product of the process. The material flowing through conduit 17 may be divided into product and recycle prior to elevation, if desired. This product material from line 28 is passed through a line 29 into a storage vessel 30. The downflowing mass of recycle crumb and raw crumb is identified in vessel 15 by reference numeral 19. Gases containing only a minor content of carbon black are removed from the vessel by way of the line 16 and are introduced into a cyclonic separator 31. In case a second cyclonic separator is needed for stripping the gases of their final carbon content a second cyclonic separator 32 is provided, a clean off-gas issuing therefrom through a conduit 33 for such disposal as desired. Material separated from the cyclonic separators 31 and 32 is removed therefrom by way of conduits 34 and 35, respectively. Material from line 34 may be passed through a conduit 36 and be added to the material from conduit 35 and the combined material passed from the system through a conduit 37. If desired, however, the separated materials passing through lines 34 and 35 may be added to the crumb-carbon black product in conduit 29 and the combined product passed into the storage vessel 30.

In case it is preferred for any reason whatever to use an electrostatic precipitator system in place of the cyclonic separators 31 and 32 or in conjunction therewith, an electrostatic precipitator as illustrated diagrammatically in Figure 2 may be used. The gases containing a relatively small amount of carbon black are passed through line 16, which is the same line as line 16 of Figure 1, into the electrostatic precipitator vessel 51. Electric power from a source, not shown, is led to the vessel by wires 52. Recovered material is withdrawn from the vessel through a conduit 54 for such disposal as desired. Effluent gases from this vessel are passed through a conduit 53 for further treatment in cyclonic separators or for such other disposal as desired. Bag filters may be used in conjunction with or in place of cyclones 31, 32 and electrostatic separator 51.

In the operation of the embodiment of apparatus illustrated in Figure 1 the carbon black containing smoke from the reactors and cooling equipment is introduced into the agglomerator vessel through line 14 at a temperature of about 265° F. This black flows upward and in countercurrent direction to downflowing particles of rubber crumb. In this manner the downflowing rubber crumb intimately contacts the upflowing carbon black and carbon black adheres to the surface of the crumb particles. To acquire a considerable amount of carbon black on the crumb surface, the crumb after being removed through conduit apparatus 17 and elevator 27 is divided into two portions, one portion being reintroduced into the treating vessel through a distributor 26. In this manner crumb can be recycled a sufficiently great number of times until it has acquired the coating of carbon black desired. Thus, by regulating the dividing operation of the elevated crumb as regards the proportion which is recycled I am able to control the final carbon content of the crumb. The introduction of new or raw crumb through distributor 24 above the level of introduction of the recycle crumb makes for a true countercurrent type operation and the addition of this raw crumb to the upper portion of the vessel assists markedly in stripping further carbon black from the gases. Since the upward velocity of the carbon black carrying gases in the treating vessel 15 is quite rapid there may be a tendency to carry finely divided crumb from the vessel to the overhead line 16. To eliminate this tendency as much as practical, impingement separators 25 are provided. Those separators operate in a manner similar to mist separators in fractionating and treating equipment.

As mentioned hereinbefore any carbon black not removed from the gas in the crumb rubber contacting operation may be removed by cyclonic separator 31 and 32 or by electrostatic precipitation according to the apparatus illustrated in Figure 2 or by the use of the electrostatic apparatus Figure 2 in conjunction with cyclonic separator.

The crumb-carbon black product may be used in any desired rubber compounding operation in which the type of crumb and the type of carbon black are desired. As mentioned hereinbefore additional carbon black may at times be needed.

Any of the extender oils ordinarily employed in rubber making operations may be used with the crumb rubber as herein disclosed. These oils in addition to the term extender oils are frequently known as rubber processing oils or plasticizers. Oils which may be used with crumb rubber for recovering carbon black include both saturated and unsaturated materials, the latter being those of the so-called vulcanizable plasticizer type. Examples of liquid plasticizers which are useful herein include liquid conjugated diolefins such as liquid polybutadiene, liquid polyisoprene, liquid polychloroprene, liquid polypiperylene, liquid polypentadiene, liquid butadiene-styrene and other liquid copolymers, hydroxylated derivatives of the foregoing polymers and copolymers and esters thereof, various hydrocarbon oils such as are obtained from catalytic cracking and dehydrogenation operations, extract oils from solvent extraction of lubricating oil stocks with furfural, phenol, etc., catalyst soluble oils from alkylation reactions, polymers from clay treating of cracked gasoline, and the like.

These processing oils may be incorporated into the rubber in the coagulation operation as is usually done commercially.

Standard antioxidants such as (PBNA) phenyl-B-naphthyl amine; (BLE) a diphenyl amine reaction product with acetone, and (Agerite Stalite) a mixture of mono- and dihepthylated diphenyl amines may be used. These antioxidants may also preferably be incorporated into the rubber during the regular coagulation operation in which the crumb is produced. The presence of an antioxidant and the carbon black removal operation in a reducing atmosphere assist in prevention of the deterioration or degradation of the crumb rubber during the carbon black-crumb rubber contacting operation.

By use of an antioxidant such as the above mentioned PBNA, I am able to contact the crumb rubber with the carbon black containing furnace gases at temperatures as high as 300° F. However, it is preferable to maintain temperature within vessel 15 of Figure 1 at temperatures below 400°, such as 300° F. or below. In the drawing the carbon black containing furnace gases are illustrated as entering the treating system at 265° F. The temperature may, however, be above or below this value in this carbon black feed line. It should be above the dew point of the gas, however, to avoid condensation of moisture in the collection system.

The conveyors and/or feeders for handling solid material herein disclosed may be selected from among such equipment commercially available and deemed suitable for the purpose at hand.

Such auxiliary apparatus as temperatures indicators, recorders and controllers, flow indicating, recording and controlling devices and the like are not described in the specification nor illustrated in the drawing for purposes of simplicity and brevity. However, the need for the installation and operation of such auxiliary apparatus is well understood by those skilled in the art.

While certain embodiments of the invention have been described for illustrative purposes, the invention obviously is not limited thereto.

Having disclosed my invention, I claim:

1. A method for separating and collecting carbon black from carbon black production furnace effluent gases comprising contacting said furnace effluent with a solid material comprising dried crumb rubber, withdrawing said dried crumb rubber with adhering carbon black and gases of decreased carbon black content as separate products of the operation.

2. A method for separating and collecting carbon black from carbon black production furnace effluent gases comprising contacting said furnace effluent with a composition of dried crumb rubber containing extender oil, withdrawing said dried crumb rubber containing extender oil with adhering carbon black and gases of decreased carbon black content as separate products of the operation.

3. A method for separating and recovering carbon black from carbon black production furnace effluent gases comprising intimately contacting dried rubber crumb with said carbon black furnace gases at a temperature of 300° F. and below, recovering the dried rubber crumb with adhering carbon black and gases of decreased carbon black content as separate products of the process.

4. The method of claim 3 wherein said crumb is passed downward under the influence of gravity in countercurrent relation to upflowing carbon black containing gases.

5. The method of claim 4 wherein the recovered rubber crumb with adhering carbon black is divided into two portions, recycling one portion into the contacting operation and removing the second portion as the product of the process.

6. A method for separating and recovering carbon black from carbon black production furnace effluent gases comprising intimately contacting dried rubber crumb containing an extender oil with said carbon black furnace gases at a temperature of 300° F. and below, recovering said dried rubber crumb containing extender oil and adhering carbon black and gases of decreased carbon black content as separate products of the process.

7. The method of claim 6 wherein said crumb is passed downward in countercurrent relation to upflowing carbon black furnace effluent.

8. The method of claim 7 wherein the recovered rubber crumb containing extender oil and adhering carbon black is divided into two portions, recycling one portion into the contacting operation to recover additional carbon black and removing the second portion as one product of the process.

9. A method for separating and collecting carbon black from carbon black production furnace effluent comprising maintaining a downward moving mass of dried synthetic rubber crumb in a contacting zone, introducing dried synthetic rubber crumb into the upper portion of said zone, introducing carbon black production furnace effluent into said zone at a point near its bottom, removing gases containing less carbon black than said furnace effluent from the top of said zone, separating carbon black from the removed gases by cyclonic action, withdrawing crumb with adhering carbon black from the bottom of said zone, dividing this withdrawn crumb into two portions, returning one portion to the mass of downflowing crumb, and recovering the carbon black separated by cyclonic action and the second portion of crumb with adhering carbon black as separate products of the process.

10. In the method of claim 9, combining the carbon black separated by cyclonic action with the second portion of crumb with adhering carbon black as a combined product of the process.

11. As in the method of claim 9 wherein said synthetic rubber crumb contains an extender oil.

12. In the method of claim 11, combining the carbon black separated by cyclonic action with the second portion of crumb with adhering carbon black as a combined product of the process.

13. The method of claim 9 wherein the carbon black is removed from said gases containing less carbon black than said furnace effluent by electrostatic action.

14. The method of claim 11 wherein the carbon black is removed from said gases containing less carbon black than said furnace effluent by electrostatic action.

15. The method of claim 9 wherein the carbon black is removed from said gases containing less carbon black than said furnace effluent by bag filtration.

16. The method of claim 11 wherein the carbon black is removed from said gases containing less carbon black than said furnace effluent by bag filtration.

References Cited in the file of this patent

UNITED STATES PATENTS 2,585,659     Kilpatrick _____ Feb. 12, 1952